United States Patent [19]

Patel

[11] 3,851,306

[45] Nov. 26, 1974

[54] TRIPLE TRACK ERROR CORRECTION

[75] Inventor: Arvind M. Patel, Wappingers Falls, N.Y.

[73] Assignee: International Business Machines Corporation, Armonk, N.Y.

[22] Filed: Nov. 24, 1972

[21] Appl. No.: 309,388

[52] U.S. Cl. .......... 340/146.1 AL
[51] Int. Cl. .......... G06f 11/12
[58] Field of Search. 340/146.1, 146.1 AL, 146.1 F, 340/174.1 B; 360/53

[56] References Cited

UNITED STATES PATENTS

| | | | |
|---|---|---|---|
| 3,504,340 | 3/1970 | Allen | 340/146.1 AL |
| 3,629,824 | 12/1971 | Bossen | 340/146.1 AL |
| 3,656,107 | 4/1972 | Mv-Yue Hsiao et al. | 340/146.1 AL |
| 3,675,200 | 7/1972 | Bossen | 340/146.1 AL |
| 3,685,014 | 8/1972 | My-Yue Hsiao et al. | 340/146.1 AL |
| 3,697,948 | 10/1972 | Bossen | 340/146.1 AL |

*Primary Examiner*—Malcolm A. Morrison
*Assistant Examiner*—David H. Malzahn
*Attorney, Agent, or Firm*—Douglas R. McKechnie

[57] ABSTRACT

A method for correcting errors in up to three tracks or channels in a multi-track data system is provided. Message data is formed into a codeword by adding three check bytes thereto which are dependent on each other and are generated from the information bytes. After the data has undergone some form of transposition, at which time it is desirable to check for errors and correct any errors within the capability of the code, the transposed data is decoded so as to generate three syndromes. At the time of data transposition, error pointers may be provided. When the provided pointers indicate that either two or three tracks contain errors, error patterns are generated and added to the information already within the tracks in error, to correct the errors. If only one pointer is provided, a check is made to see whether or not another track is in error even though a pointer was not provided, and, if an additional track is in error, its pointer is generated. Thereafter these two tracks are corrected. Similarly, if no pointer is provided, a check is made to determine whether or not there was at least one track in error. If so, the pointer is generated and the error is corrected. An uncorrectable error indication is provided when errors are encountered that lie outside of the correction capability of the code.

8 Claims, 12 Drawing Figures

54

| | | | | | | | |
|---|---|---|---|---|---|---|---|
| 0 | 0 | 0 | 1 | 1 | 1 | 1 | 1 |
| 1 | 1 | 0 | 1 | 1 | 0 | 1 | 1 |
| 1 | 0 | 1 | 1 | 1 | 0 | 0 | 1 |
| 1 | 0 | 0 | 0 | 1 | 0 | 0 | 0 |
| 0 | 1 | 0 | 0 | 0 | 1 | 0 | 0 |
| 0 | 0 | 1 | 0 | 0 | 0 | 1 | 0 |
| 0 | 0 | 0 | 1 | 0 | 0 | 0 | 1 |
| 1 | 1 | 0 | 1 | 1 | 1 | 0 | 0 |

55

| | | | | | | | |
|---|---|---|---|---|---|---|---|
| 1 | 0 | 1 | 0 | 0 | 0 | 1 | 1 |
| 1 | 0 | 0 | 0 | 0 | 1 | 0 | 1 |
| 1 | 0 | 0 | 1 | 0 | 1 | 1 | 0 |
| 0 | 1 | 0 | 0 | 1 | 0 | 1 | 1 |
| 1 | 1 | 1 | 1 | 0 | 0 | 0 | 1 |
| 1 | 0 | 1 | 0 | 1 | 1 | 0 | 0 |
| 0 | 1 | 0 | 1 | 0 | 1 | 1 | 0 |
| 0 | 0 | 1 | 0 | 1 | 0 | 1 | 1 |

56

| | | | | | | | |
|---|---|---|---|---|---|---|---|
| 0 | 0 | 1 | 1 | 1 | 1 | 0 | 0 |
| 0 | 0 | 0 | 1 | 1 | 1 | 1 | 0 |
| 0 | 0 | 0 | 0 | 1 | 1 | 1 | 1 |
| 1 | 1 | 0 | 1 | 0 | 0 | 1 | 1 |
| 1 | 0 | 1 | 1 | 1 | 1 | 0 | 1 |
| 1 | 0 | 0 | 0 | 1 | 0 | 1 | 0 |
| 0 | 1 | 0 | 0 | 0 | 1 | 0 | 1 |
| 1 | 1 | 1 | 1 | 0 | 1 | 1 | 0 |

78

$$\begin{bmatrix} 0 & 1 & 0 & 0 & 1 & 0 & 0 & 0 \\ 0 & 0 & 1 & 0 & 0 & 1 & 0 & 0 \\ 0 & 0 & 0 & 1 & 0 & 0 & 1 & 0 \\ 0 & 0 & 0 & 0 & 1 & 0 & 0 & 1 \\ 1 & 1 & 0 & 1 & 0 & 0 & 0 & 0 \\ 0 & 1 & 1 & 0 & 1 & 0 & 0 & 0 \\ 0 & 0 & 1 & 1 & 0 & 1 & 0 & 0 \\ 0 & 0 & 0 & 1 & 1 & 0 & 1 & 0 \end{bmatrix}$$

79

$$\begin{bmatrix} 1 & 1 & 1 & 1 & 0 & 1 & 0 & 0 \\ 0 & 1 & 1 & 1 & 1 & 0 & 1 & 0 \\ 0 & 0 & 1 & 1 & 1 & 1 & 0 & 1 \\ 1 & 1 & 0 & 0 & 1 & 0 & 1 & 0 \\ 0 & 1 & 1 & 0 & 0 & 1 & 0 & 1 \\ 1 & 1 & 1 & 0 & 0 & 1 & 1 & 0 \\ 0 & 1 & 1 & 1 & 0 & 0 & 1 & 1 \\ 1 & 1 & 1 & 0 & 1 & 1 & 0 & 1 \end{bmatrix}$$

TRIPLE TRACK ERROR CORRECTION

CROSS-REFERENCE TO RELATED APPLICATION

Application entitled "Error Correction For Two Tracks in a Multi-Track System," Ser. No. 212,544, filed Dec. 27, 1971 by Arvind M. Patel, now Pat. 3,445,528, and assigned to the assignee of the present application.

BACKGROUND OF THE INVENTION

This invention relates to data encoding, error detection and error correction and, more particularly, to an improved method for correcting up to at least three tracks in error in a multi-track data system.

In data processing systems, it is known to encode data in such a manner as to facilitate detection of errors therein when the data is transmitted within the system and perhaps recorded on a storage media such as a magnetic tape. An example of an error detection and correction system is disclosed in the above-identified related application. The invention there disclosed is capable of correcting up to two tracks in error. However, in the general area of magnetic tape, as tracks become closer and tape density becomes higher, there is an increased risk that more than two tracks might contain errors or be erased. The present invention is directed to an error correction system involving a modification of the method disclosed in said application which modification provides the increased function or ability to correct three tracks in which errors or erasures have occurred. Errors which occur on less than three tracks can also be corrected.

In accordance with the invention disclosed in said application, check bytes are generated each independent from each other but derived from the information. The characteristics possessed by the check bytes have a different mathematical structure than that of the information bytes. Because of this, when errors occur in different combinations of the check byte track and an information track, a number of special case situations are created which have to be dealt with separately. If one were to extend the concept presented in said application from two tracks to three tracks, then the number of special cases created by the decoding has to separately treat the check bytes and information bytes, would greatly increase either the hardware and time necessary for decoding and correction or it would increase any special programming routines necessary for the analysis and eventual correction.

Accordingly, one of the objects of the invention is to provide a method of data encoding, decoding and error correction in which errors in up to three tracks can be corrected.

Another object of the invention is to provide a coding, decoding method in which check bytes are generated and combined with information bytes so that the two types of bytes are indistinguishable during decoding and create no special cases due to any different nature between the check bytes and information bytes.

Another object of the invention is to provide a method of error correction that can be automatically performed in the processing system by using a computer and known programming techniques.

BRIEF DESCRIPTION OF THE DRAWINGS

The foregoing and other objects, features and advantages of the invention will be apparent from the following more particular description of a preferred embodiment of the invention, as illustrated in the accompanying drawings.

GENERAL DESCRIPTION

Figure 1:
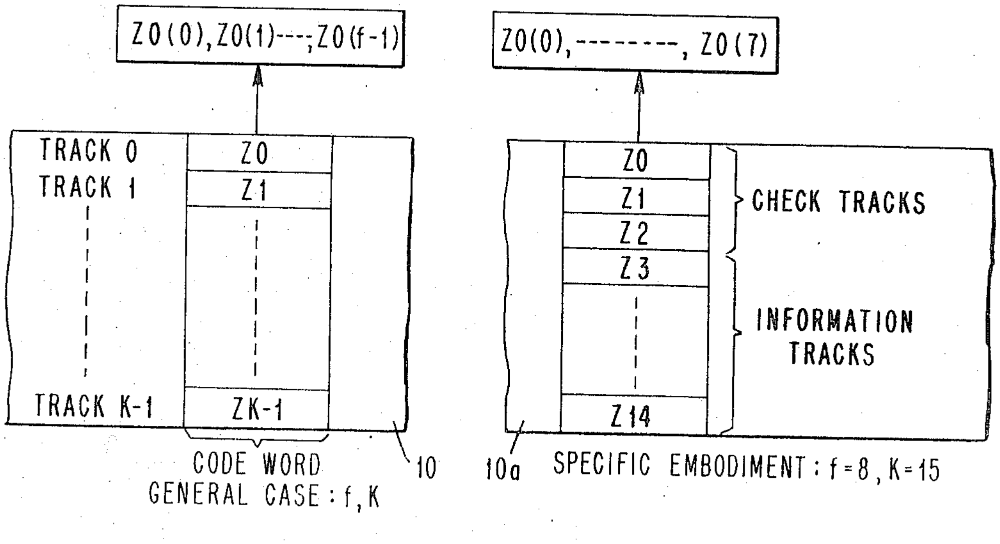
FIG. 1 is a schematic diagram showing the general arrangement of data on a tape recording media.

Referring now to the drawings, FIG. 1 generally illustrates the data arrangement of information recorded on a tape. A magnetic tape 10 has $K$ parallel tracks in which information is recorded along each track. Information along the track is grouped into a code word composed of $K$ bytes $Z$. Each byte has the same numeral as the track in which it is located. Further, each byte $Z$ is composed of $f$ bits Z (0) through Z ($f$-1). It is thus seen that a code word comprises $K$ bytes $Z$ of $f$ bits.

In accordance with the invention, the minimum number of tracks is four, three tracks being check tracks and one track being an information track, whereby the invention provides the capability of correcting erasure that might occur in three or less of these tracks. However, for most practical purposes, more than one information track is needed and thus, within the specific embodiment to be described hereafter, there are 12 information tracks, 3–14 provided for carrying information bytes $Z3$–$Z14$. In the specific embodiment discussed hereafter and shown on tape 10*a*, each byte $Z$ has eight bits and thus the specific embodiment represents the situation under the general case of where $f$=8 and $K$=15.

Figure 2:
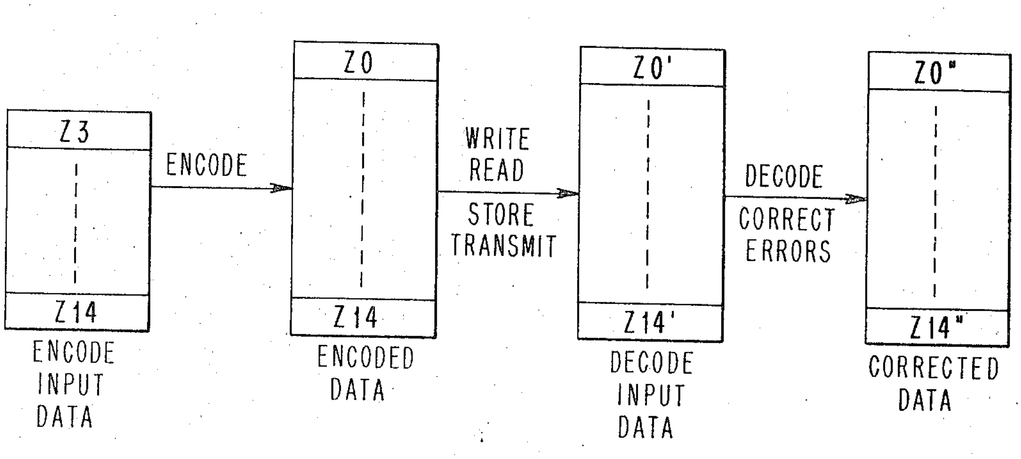
FIG. 2 is a schematic data process diagram useful in understanding the general process of the invention and understanding certain symbology used in the specification.

FIG. 2 illustrates the general flow of data and symbology used to represent data in its different forms. At the start of the process, information bytes $Z3$–$Z14$ are provided as input data for the encoding process. During encoding, check bytes $Z0$–$Z2$ are generated and added to the information bytes $Z3$–$Z14$ to form the encoded data or codeword. Thereafter, this data undergoes some form of transposition. For example, it can be first written onto a tape and then read therefrom, or it might merely be placed in some form of data processing storage other than tape, or it might be transmitted or communicated from one data processing unit to another. In any event, the output of the data transposition step is the decode input data bytes $Z0'$–$14'$. In this form, the data may or may not have any errors in it. It next undergoes the decoding process and the errors are corrected to form the corrected data bytes $Z0''$–$Z14''$. At this point, the corrected data can maintain the check bytes $Z0''$–$Z2''$ or the original input information bytes $Z3''$–$Z14''$ may be extracted therefrom for usage.

Figure 3:
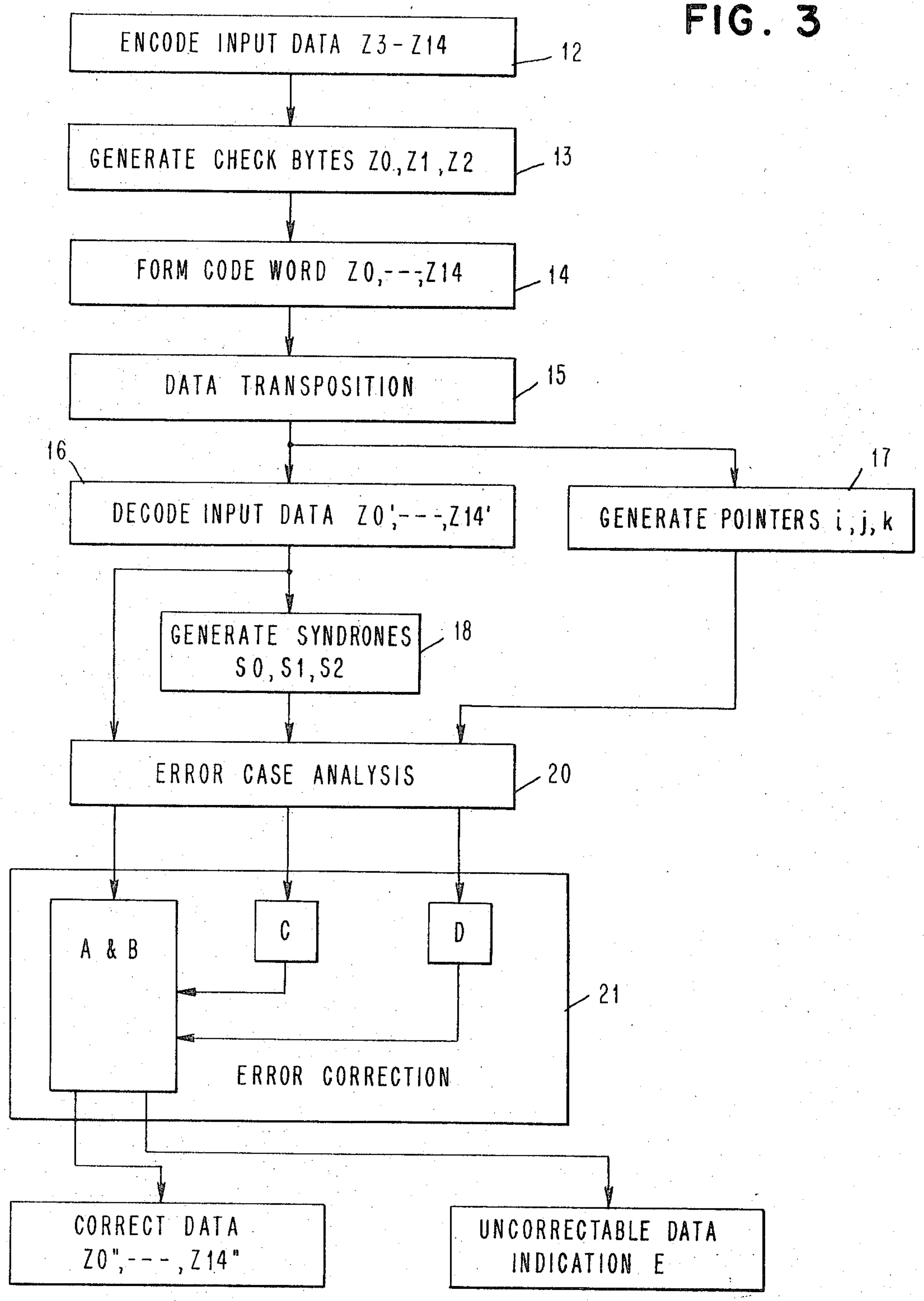
FIG. 3 is a flowchart disclosing the general steps of the process embodying the invention.

FIG. 3 illustrates in flowchart form the general process embodying the invention. As shown in this figure, the first step 12 involves supplying the information bytes $Z3$–$Z14$ as an input to the subsequent encoding steps. From the information bytes, step 13 generates the check bytes $Z0$–$Z2$ which are then combined in step 14 to form the code word $Z0$–$Z14$. This code word then undergoes in step 15 some form of transposition as for example being recorded or written onto a magnetic tape storage media in parallel tracks and later read therefrom. The data, having undergone transposition, is provided in step 16 as the input data for the decoding steps. During the transposition process, step 17 generates pointers $i$, $j$ and $k$ which point to the tracks or bytes in error. The decode input data is then supplied as an input to step 18 which generates the syndromes $S0$–$S2$. The combined outputs of step 16, 17 and 18 are then provided as an input to an error case analysis step 20 which, dependent upon the various detailed conditions described hereafter, starts an error correction step 21 at one of three different cases of error conditions which require slightly different error correction processing. The output of error correction step 21 will either be the corrected data $Z0''$–$Z14''$ or it will be a signal E indicating that an uncorrectable error exists. Except for the detailed differences in the check byte generation and error correcting analysis, the process generally shown in FIG. 3 is generally the same as that disclosed in the above-identified related docket. These detailed differences will be apparent in the following detailed description.

Before with any further discussion relative to the drawings, the general mathematical relationships of the encoding syndrome generation and error correction processes will now be explained.

The codeword for the general case is constructed from $Z3$–$Z(X-1)$ where $Z0$–$Z2$ are generated and satisfy the following relationships:

$$Z0 \oplus Z1 \oplus Z2 \cdots \oplus Z(K-1) = 0 \qquad (1)$$

$$Z0 \oplus Z1T^{\lambda} \oplus Z2(T^{\lambda})^2 \cdots \oplus Z(K-1)(T^{\lambda})^{K-1} = 0 \qquad (2)$$

$$Z0 \oplus Z1T^{2\lambda} \oplus Z2(T^{2\lambda})^2 \cdots \oplus Z(K-1)(T^{2\lambda})^{K-1} = 0 \qquad (3)$$

Syndromes $S0$–$S2$ are generated according to the following relationships:

$$S0 = Z0' \oplus Z1' \oplus Z2' \oplus \cdots \oplus Z(K-1)' \qquad (4)$$

$$S1 = Z0' \oplus Z1'T^{\lambda} \oplus Z2'(T^{\lambda})^2 \oplus \cdots \oplus Z(K-1)'(T^{\lambda})^{K-1} \qquad (5)$$

$$S2 = Z0' \oplus Z1'T^{2\lambda} \oplus Z2'(T^{2\lambda}) \oplus \cdots \oplus Z(K-1)'(T^{2\lambda})^{K-1} \qquad (6)$$

In these expressions, $\oplus$ = modulo two sum of corresponding binary digits $T$ = companion matrix of binary primitive polynomial $g(x)$ of degree $f$ $$\lambda = r\,(2^f-1)/(2^b-1) \qquad (7)$$

$r$ is any positive integer prime to $2^b-1$ $K$ is an integer $3 < K < 2^b$ $$f = bm \qquad (8)$$

where $m$, $b$ and $f$ are integers

This general case evolves into the expressions for the specific embodiment as follows. Let $f=8$ thus corresponding to an 8 bit adjacency binary vector. Let $b=4$. Therefore, $K$ can range from 4 to 15. Let $K=15$ thus providing a maximum number of tracks for the 8-bit byte. In accordance with egn. (7), $\lambda = 17r$. $r$ can be arbitrarily selected so long as it is a positive integer prime to $2^b-1$ or 15, but, as will later be pointed out, if it is given the value of 4, certain benefits will accrue. With $r=4$, $\lambda = 68$. These figures of $K=15$ and $\lambda = 68$ can then be placed in egns. (1–6) to produce the specific expressions relating Z0–Z2 and So–S2 for the specific embodiment of 15 bytes or tracks of 8 bits. The specific primitive polynomial of degree $f=8$ is $g(x) = 1 + x + x^3 + x^5 + x^8$ and the corresponding companion matrix is $$T = \begin{bmatrix} 0&1&0&0&0&0&0&0 \\ 0&0&1&0&0&0&0&0 \\ 0&0&0&1&0&0&0&0 \\ 0&0&0&0&1&0&0&0 \\ 0&0&0&0&0&1&0&0 \\ 0&0&0&0&0&0&1&0 \\ 0&0&0&0&0&0&0&1 \\ 1&1&0&1&0&1&0&0 \end{bmatrix}$$

DETAILED DESCRIPTION

Encoding

Figure 4:
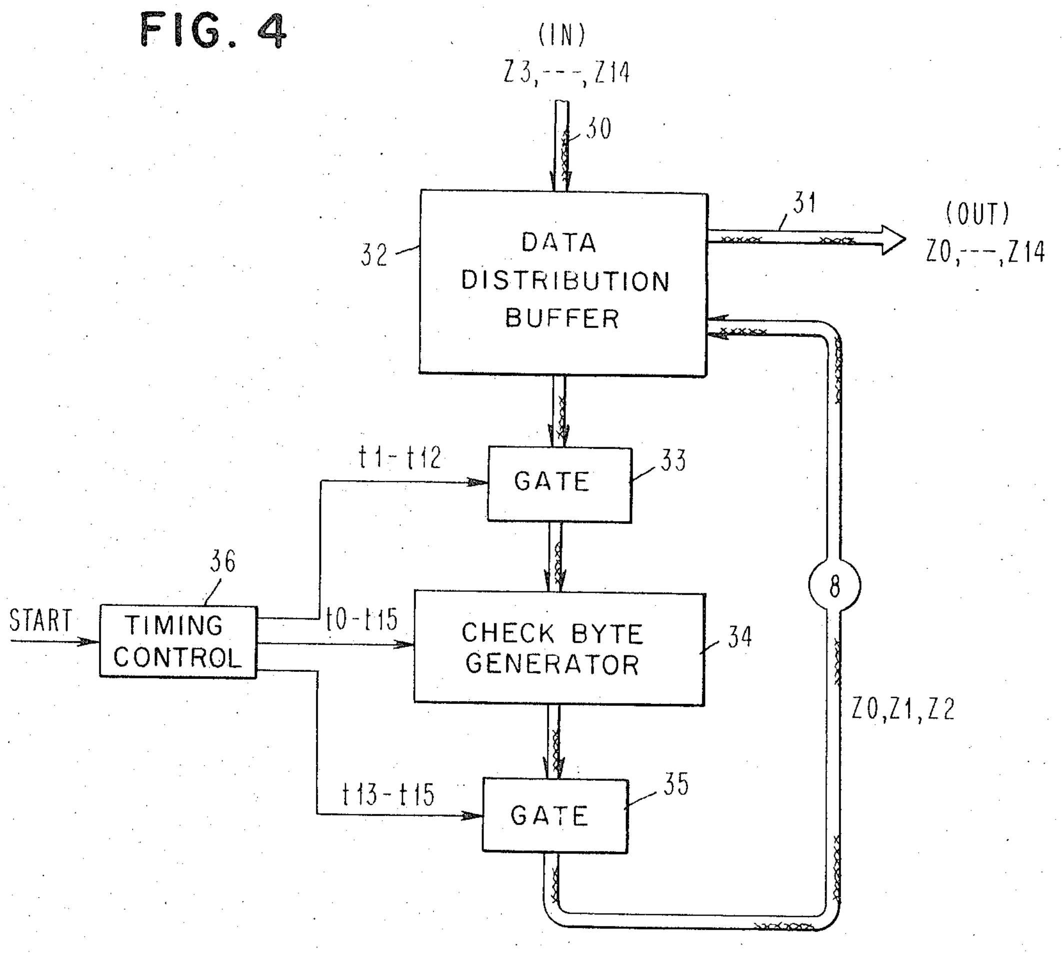
FIG. 4 is a block diagram of apparatus for generating check bytes and forming a code word.
Figure 5:
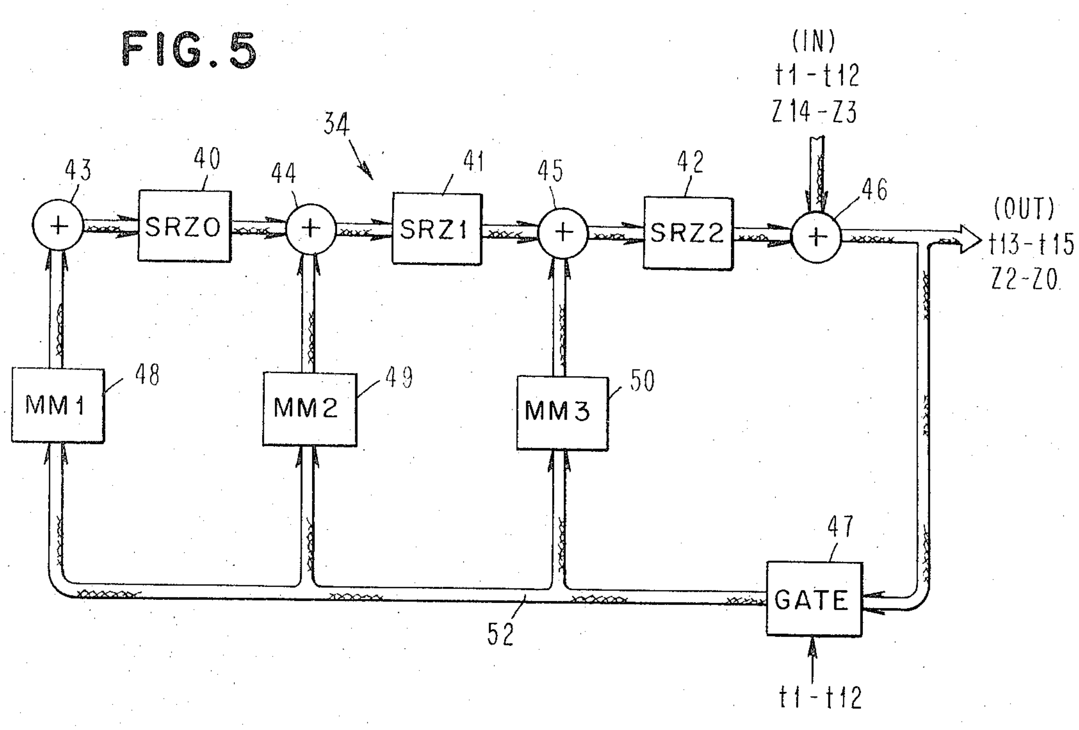
FIG. 5 is a schematic diagram of the check byte
Figure 6:
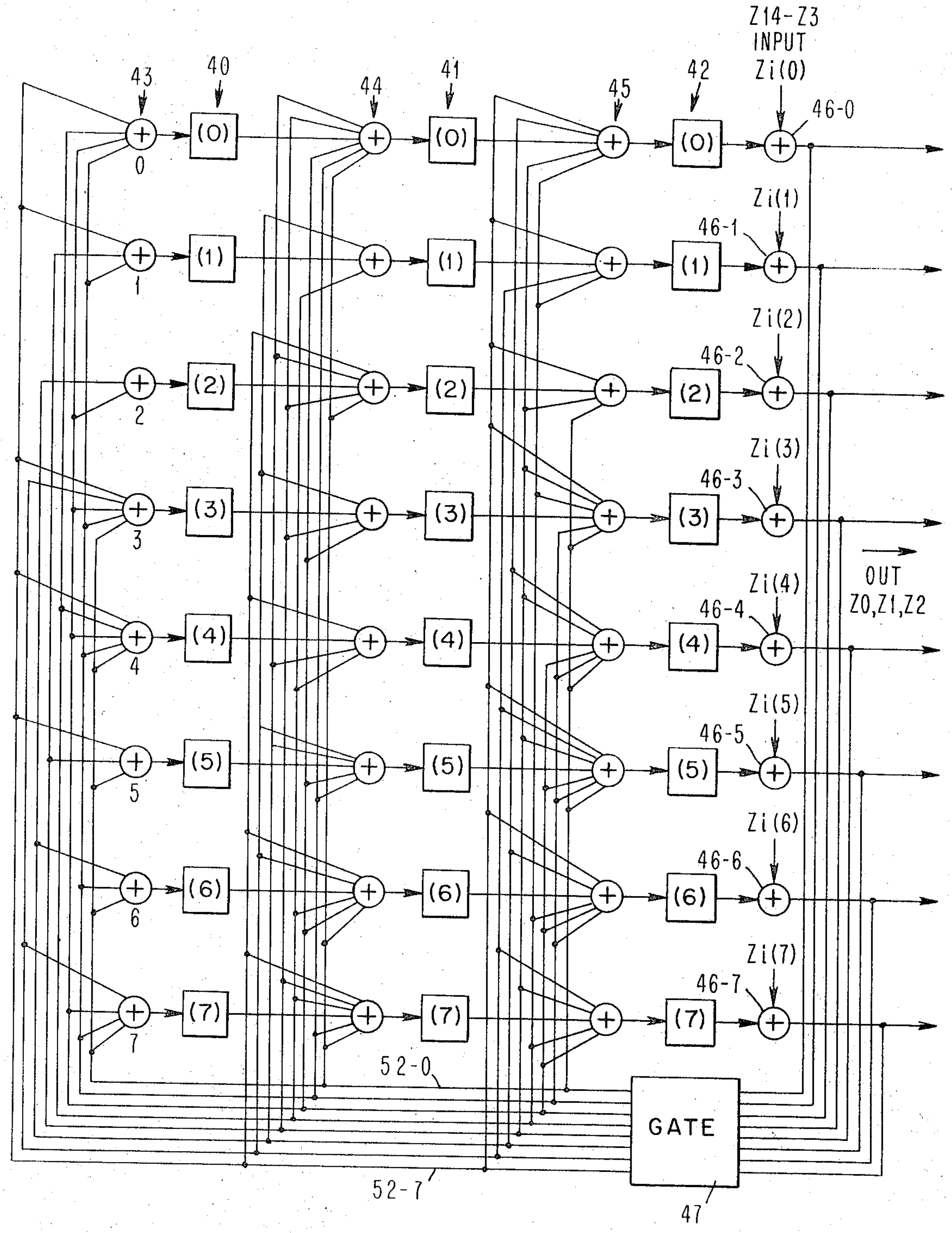
FIG. 6 is a detailed block diagram of the check byte generator shown in FIG. 5.

FIGS. 4–6 generally show apparatus for performing the encoding process. With reference to the block diagrams in FIG. 4, the apparatus includes an IN bus 30 over which data bytes $Z3$–$Z14$ are placed in a data distribution buffer 32. The system includes a check byte generator 34 which, utilizing bytes $Z3$–$Z14$, generates the check bytes $Z0$–$Z2$. The check bytes are placed in buffer 32 and an OUT bus 31 makes the codeword bytes $Z0$–$Z14$ available for usage or transposition in the manner previously indicated. Buffer 32 can be of any well known type of buffer which in the specific embodiment shown would have the capacity to store 15 8-bit bytes. The system also includes gates 33 and 35 for controlling the flow of bytes to and from generator 34. A timing control 36 in response to receiving a start signal would generate timing pulses $t0$–$t15$. On pulse $t0$, generator 34 is set to 0. On pulse $t1$, byte $Z14$ is placed in the check byte generator where it is acted on in the manner described more fully below. Thereafter, on subsequent timing pulses $t2$–$t12$, check bytes $Z13$–$Z3$ are placed in the generator so that at time $t12$, the check bytes $Z0$–$Z2$ are contained within generator 34. Thereafter, on timing pulses $t13$–$t15$, check bytes $Z2$–$Z0$ are placed in the buffer 32 to form therein the codeword.

FIG. 5 schematically shows the functions performed by the check byte generator shown specifically in FIG. 6. Generator 34 includes a shift register having three stages 40, 41 and 42, which hold the products being produced by the adder-multiplier operations below. Each stage contains conventional storage devices for representing one byte or 8 bits of information. Modulo two-sum adders (exclusive-or circuits) 43–45 are connected to the inputs of the shift register stages, the adders being associated with matrix multipliers 48, 49 and 50, also designated MM1-MM3. Another modulo two-sum adder 46 is connected to the output of stage 42. It receives as input bytes $Z14$–$Z3$, in that order, on timing signals $t1$–$t12$. Each incoming byte is then added with the output of stage 42 and the series of sums are passed through a gate 47, during timing signals $t1$–$t12$, so as to be applied to the inputs of the matrix multipliers to produce a series of three products applied as inputs to adders 43–45. The outputs of stages 40 and 41 are inputs to adders 44 and 45. At time $t12$, check bytes $Z0$–$Z2$ are contained within stages 40, 41 and 42. During subsequent time intervals $t13$–$t15$, these check bytes $Z2$–$Z0$ are then read out of the shift register stages and, as previously indicated, placed in the data distribution buffer 32.

In FIG. 6, each of stages 40–42 and adders 43–46 are broken to bit levels 0–7. The respective bit levels can be identified by the suffix such as 41–0 representing bit 0 of stage 41. The respective bits of an incoming byte $Z$ are applied to the inputs of adder 46 with bit 0 going to 46-0, bit 1 to 46-1, etc. The output of adder 46 has 8 bit paths connected to the input of gate 47 and it in turn has an output bus 52 the respective lines of which are designated 0–7 in accordance with bit designation of the byte being carried thereby. The connections of the bus respective lines of 52 to the inputs of adders 43–45 perform the matrix multiplication which eventually generates the necessary check bytes.

Figures 7, 8:
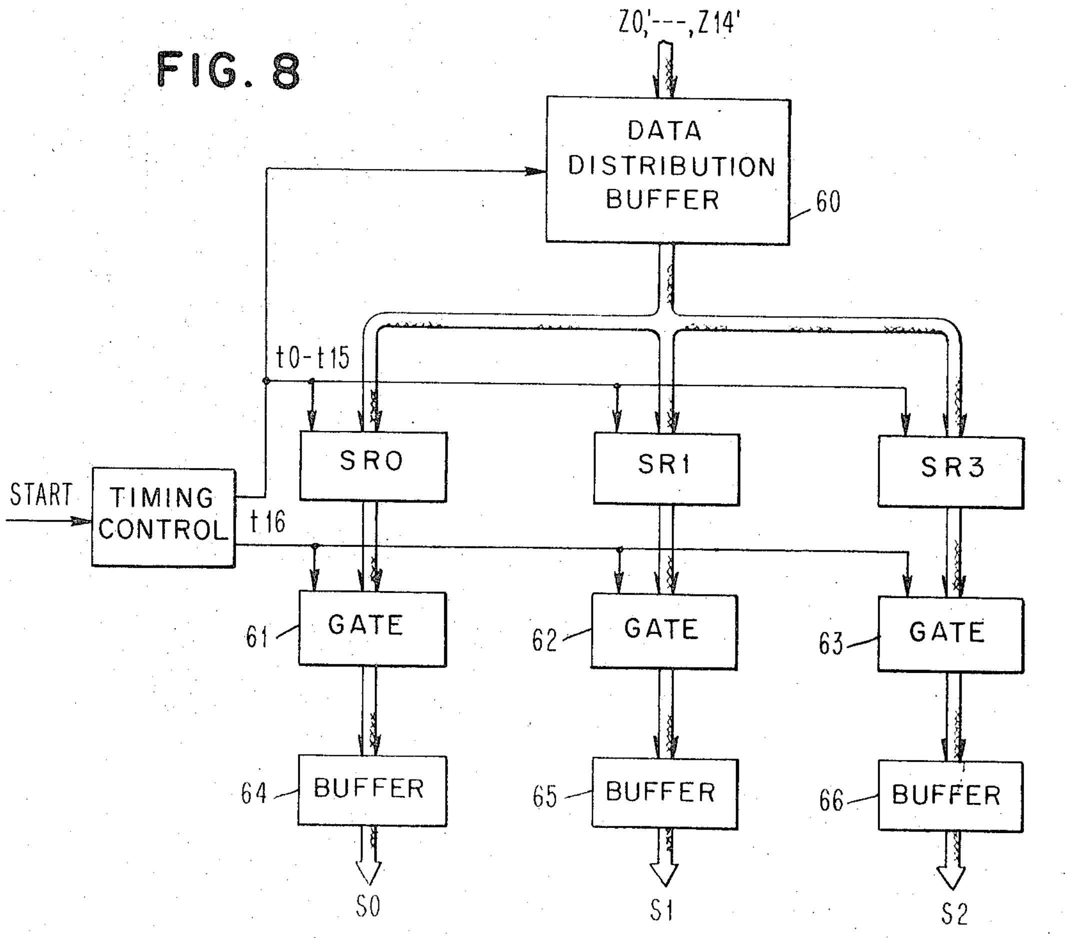
FIG. 7 shows three matrices useful in understanding the specific wiring connection shown in FIG. 6.
FIG. 8 is a block diagram of apparatus for carrying out the syndrome generation step.

To better understand the multiplication, FIG. 7 shows three matrices 54, 55, and 56. These matrices are used to generate the check bytes which satisfy equations (1–3). These matrices are in accordance with the following relationships of matrix 54 is $T^{3\lambda}$ matrix 55 is $T^{\lambda}(I \oplus T^{\lambda} \oplus T^{2\lambda})$ matrix 56 is $(\overline{I \oplus T^{\lambda} \oplus T^{2\lambda}})$, where $I$ is the identity matrix $(T^{(2^b-1)\lambda} = I)$. The matrices 54–56 as shown conform to the specific embodiment case of $\lambda=68$ and $b=4$. $I$ for $f=8$ is $$I = \begin{bmatrix} 1&0&0&0&0&0&0&0\\ 0&1&0&0&0&0&0&0\\ 0&0&1&0&0&0&0&0\\ 0&0&0&1&0&0&0&0\\ 0&0&0&0&1&0&0&0\\ 0&0&0&0&0&1&0&0\\ 0&0&0&0&0&0&1&0\\ 0&0&0&0&0&0&0&1 \end{bmatrix}$$

Each matrix is an eight-by-eight bit matrix. When a row vector such as a byte $Z$ is to be multiplied by the matrix, the first bit of the resultant row vector is formed by the modulo two-sum of those incoming bits appearing at the positions indicated by the ones in the matrix. For example, with reference to the multiplication occurring at adder position 43-0, the bit positions 1, 2, 3, and 7 (from the first column of matrix 54) are exclusive-or'd by 43-0. If one looks at the first column in matrix 54 in FIG. 7, it will be seen that if the upper row is designated row 0 and the bottom row is row 7 then the ones appear at the 1, 2, 3, and 7 positions. Likewise, in the specific wiring shown in FIG. 6, it will be seen that the bits appearing on lines 1, 2, 3 and 7 of bus 52 are applied as inputs to 43-0. The other inputs are connected in a similar fashion except that adders 44 and 45 also receive the outputs from the preceding shift register stages 40 and 41. It is to be understood that the principal purpose of FIG. 6 is to illustrate the specific connections by virtue of which the multiplication and modulo two summation occur. It is to be understood that conventional shift registers and modulo two-sum adders can be used and that this shift register would normally be operated in conjunction with timing signals the lines to which are not shown in FIG. 6 in order to simplify the illustration. The timing pulses and the exact logic of the shift registers are of a conventional well known type.

Syndrome Generation

FIG. 8 illustrates apparatus for performing the syndrome generation step 18 of FIG. 3. With reference to FIG. 8, the codeword $Z0'$–$Z14'$, which represents the data or codeword after transposition, and in which there may or may not be errors, is placed in a data distribution buffer 60. The output of buffer 60 is connected to the input of three separate shift registers $SR0$, $SR1$, and $SR2$. The individual bytes $Z14'$, $Z13'$, etc. are read from buffer 60 on successive timing cycles and placed in the shift registers so that when all of the bytes $Z0'$–$Z14'$ have been placed therein, the contents of the shift registers represents the syndromes S0, S1 and S2. When generated, the the syndromes are gated through gates 61, 62 and 63 into buffers 64–66. A timing control 67 provides timing signals $t0$–$t16$. On signal $t0$, registers $SR0$, $SR1$ and $SR2$ are reset to 0. On pulses $t1$–$t15$ the respective bytes $Z0'$–$Z14'$ are placed in the shift registers and on timing pulse t16, the contents of the shift registers are gated to buffers 64–66.

Figure 9:
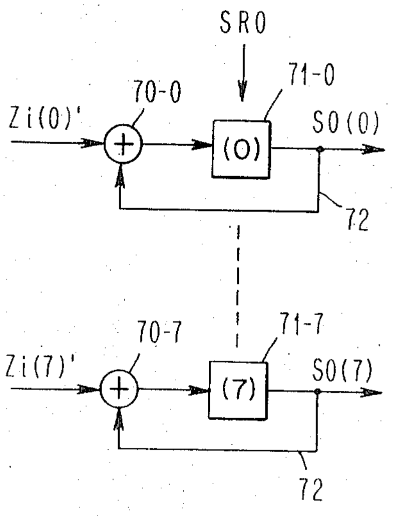
FIGS. 9–11 are detailed block diagrams of shift registers shown in FIG. 8.

SR0 is illustrated in FIG. 9 as comprising eight modulo two-sum adders 70-0 to 70-7 for receiving the respective bits 0–7 of a byte $Zi'$. The output of adder 70 is connected to the respective inputs of a plurality of shift register stages 71-0 through 71-7. The output of each stage is fed back via lines 72 to the adder 70 associated with the input. The shift register stages 71 are conventional storage devices wherein the output can be fed back as an input to the same device and by means of conventional timing signals, be applied thereto so as to produce a new output. When all bytes $Z0'$–$Z14'$ have been placed in $SR0$, the output therefrom forms the syndrome S0.

Figure 10:
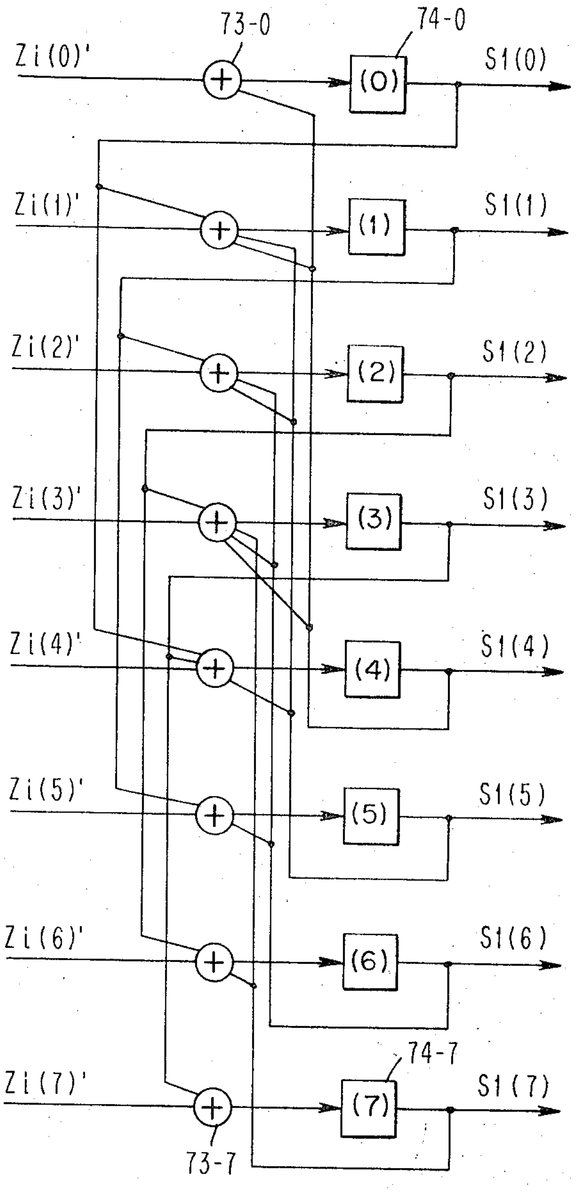
Figures 11, 12:
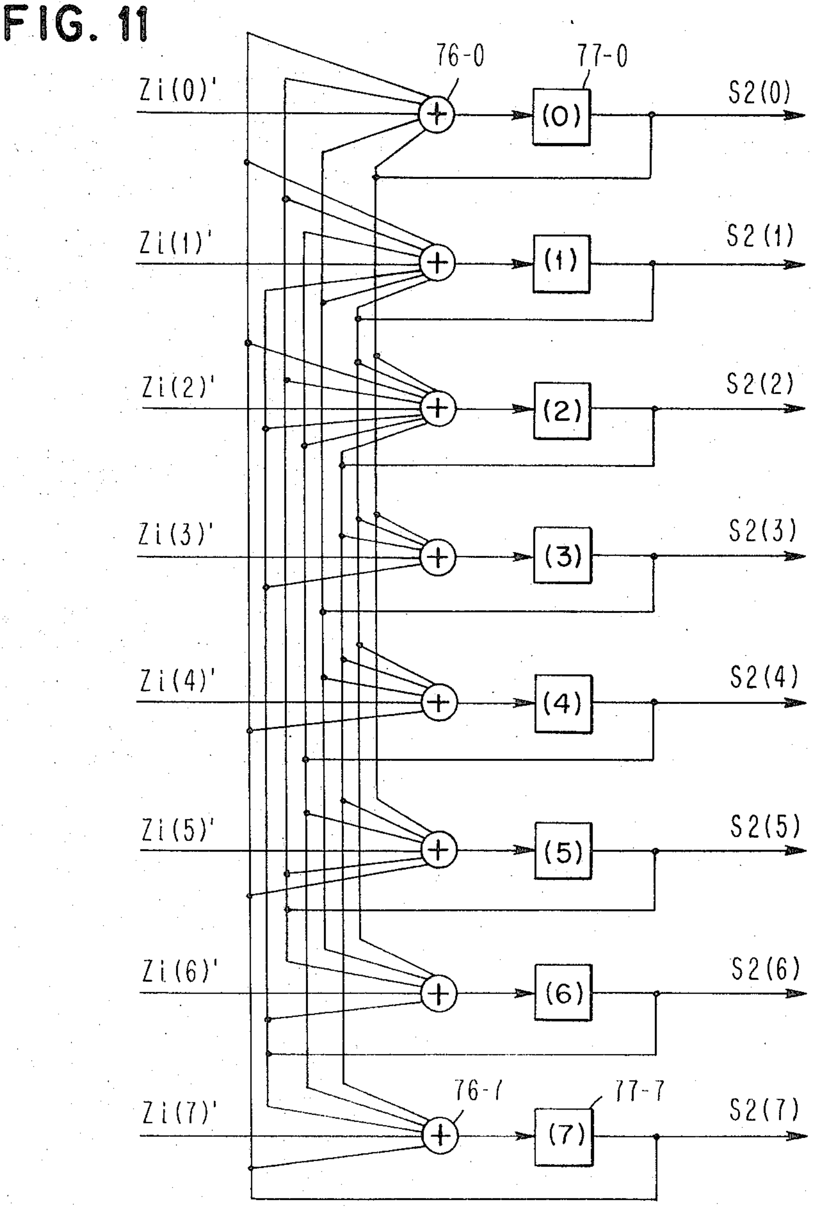
FIG. 12 illustrates two matrices useful in understanding the wiring connections made in FIGS. 10 and 11.

With reference to FIG. 10, syndrome $S1$ is produced in $SR1$ which generally comprises a plurality of modulo two-sum adders 73-0 through 73-7 and a plurality of shift register stages 74-0-74-7. Similarly, as shown in FIG. 11, SR2 comprises a plurality of adders 76-0 through 76-7 and a plurality of shift register storage devices 77-0 through 77-7. The outputs of devices 74 and 77 are fed back in a specific manner as inputs to the adders in each stage in order to generate the syndrome in accordance with the desired function. In a manner similar to the explained with reference to the wiring of FIG. 6, the specific feedback connections are in accordance with the functions shown in the matrices 78 and 79 in FIG. 12, which respectively show the matrix $T$ raised to the 68 and to the 136 powers. The selection of $\lambda=68$ minimizes the number of connections to be made for matrix 78.

It is to be appreciated that the results of this general step produces syndromes $S0$–$S2$ according to the following equations:

$$S0=Z0' \oplus Z1' \oplus Z2' \oplus \cdots \oplus Z14' \quad (9)$$

$$S1=Z0' \oplus Z1'[T^{68}] \oplus Z2'[(T^{68})^2] \oplus \cdots Z14'[(T^{68})^{14}] \quad (10)$$

$$S3=Z0' \oplus Z1'[T^{136}] \oplus Z2'[(T^{136})^2] \oplus \cdots \oplus Z14'[(T^{136})^{14}] \quad (11)$$

A non-zero value in any digit or bit position of S0, S1 or S2 indicates an error in data $Z0'$–$Z14'$.

Pointer Generation

Pointers are generated during the data transposition by conventional or known apparatus the details of which are not pertinent to an understanding of the present invention. For example, U.S. Pat. application Ser. No. 40,836, filed May 26, 1970, now Pat. 3,639,900, entitled "Enhanced Error Detection and Correction For Data Systems," describes a means of generating the pointers. For the purpose of the invention, the output of the pointer generation will be three values, $i$, $j$ and $k$ where $i$ is less than $j$ which is less than $k$. When any of these values is set to equal 15, or, in the general case $2^b-1$, which is greater than the maximum track number, then that value is taken as an indication there is no corresponding track in error. With one error, $i$ will be set to the track number and $j$ and $k$ set to 15. With two errors, $i$ and $j$ will be set to the respective track numbers and $k=15$. With three errors, all three pointers will be set to the respective track numbers. It is to be understood that because the pointer generation relies upon circuits and that the circuits are subject to operation at certain threshold levels, the presence of a pointer is not a certainty that an error has occurred in the particular track and the absence of a pointer does not mean there was no error in the track. Because of this, as will be pointed below, the decoding and error correction process will attempt to generate pointers where either no pointer or only one pointer to a track in error is provided. At the same time, if a pointer is on, i.e., it points to a track in error, and the syndromes indicate there is no error, the syndromes status overrides that of the pointers. However, in the processing, checks are also made, as pointed out below, for uncorrectable error situations lying outside the capability of the code.

Error Case Analysis

The step of error case analysis simply looks at the pointers and in dependence upon their status will enter the error correction process at one of three different points. Cases A and B are where two or three pointers are on. Case C is when one pointer is provided and Case D is when no pointer is provided.

Case A - three pointers present.

When the three pointers $i$, $j$ and $k$ are given ($0 \leq i < j < k < 2^b-1$) for three erased tracks, the code can determine the error patterns $e1$, $e2$ and $e3$ where $Zi'=Zi \oplus e1$, $Zj'=Zj \oplus e2$, and $Zk'=Zk \oplus e3$. For simplicity, let $t=T^{\lambda}$. If these values are placed in equations (1)–(6), the following relationships result:

$$S0 = e1 \oplus e2 \oplus e3 \quad (12)$$

$$S1 = e1[t^i] \oplus e2[t^j] \oplus e3[t^k] \quad (13)$$

$$S2 = e1[t^{2i}] \oplus e2[t^{2j}] \oplus e3[t^{2k}] \quad (14)$$

In other words, where, at the start of the error correction process, the variables S0, S1, and S2 are given along with pointers $i$, $j$ and $k$, the above three equations contain three unknowns, $e1$, $e2$ and $e3$.

These three unknowns can be determined by the simultaneous solution of the equations and the corrected data can be obtained by modulo-two addition according to $$Zi''=Zi' \oplus e1,\ Zj''=Zj''=Zj' \oplus e2 \text{ and } Zk''=Zk' \oplus e3.$$

Case B - two pointers present.

When two pointers $i$ and $j$ are given, it is assumed that, at most, two tracks are in error. The error patterns $e1$ and $e2$ can be obtained solving the three equations (12)–(14). The results should be $e3=0$, $e1$ and $e2$. In other words, the case of two pointers is handled as a special case of three pointers with $e3=0$. If the results are a non-zero value for $e3$, there are errors in more than two tracks and they are uncorrectable without an additional pointer.

Case C - one pointer present.

When one pointer $i$ is given, it is assumed that another track or byte $j$ may also be in error. The code is capable of generating not only error pattern e1 but also $j$ and $e2$. In a manner similar to the derivation of equations (12)–(14), the syndromes can be expressed as follows:

$$S0 = e1 \oplus e2 \quad (15)$$

$$S1 = e1[t^i] \oplus e2[t^j] \quad (16)$$

$$S2 = e1[t^{2i}] \oplus e2[t^{2j}] \quad (17)$$

Again, these are three equations with three unknowns, $e1$, $e2$ and $j$, which can be solved to find the unknowns and produce the corrected data by adding the error patterns according to $$Zi''=Zi' \oplus e1 \text{ and } Zj''=Zj' \oplus e2.$$

Case D - no pointer present.

If no pointer is given, the assumption is made that the pointer generator may have failed to recognize the error. The code is capable of error in one track provided all other tracks are error free. The following relationships exist:

$$S0 = e1 \quad (18)$$

$$S1 = e1[t^i] \quad (19)$$

$$S2 = e1[t^{2i}] \tag{20}$$

Here, its three equations with the two unknowns $i$ and $e1$. Equation 18 gives the error pattern. Equation 19 can then be solved for the track in error. Equation 20 can then be used to verify the results of the first two equations.

Error Correction

The error correction process in accordance with the invention can be performed by a general purpose computer properly programmed whereby the process is automatically executed in the computer. For example, a known conventional computer such as an IBM System 370 Model 155 provided with the normal operating system and language processors, could be used in conjunction with a program written in a higher level language such as APL or PL/1. The inputs to the error correction process are the transposed codeword bytes $Z0'$–$Z14'$, syndromes $S0$–$S2$ and pointers $i$, $j$ and $k$. It is obvious that all of this information can be placed in the main storage of the data processing system for analysis by the process performed through the execution of the program within the computer. In the following detailed discussion, expressions are given similar to those of known higher level programming languages, the expressions being in the forms of branching, calculating or assignment statements. It is within the skill of the art to translate these statements into any specific level program particularly APL because of its suitability to vector and matrix handling, but such details are not included herein as they are not necessary to understanding the process of analyzing the input data and correcting errors therein within the capability of the code.

In a manner similar to that described in the related application, the present invention uses a parameter table as an aid to performing various functions. These functions are:

$$f1(a) = -a \text{ modulo } 2^b-1; \text{ where } b=4,\ 2^b-1=15 \tag{21}$$

$$f2(a) = -a/2 \text{ modulo } 2^b-1 \tag{22}$$

$$t^{f3(a)} = (1 \oplus t^a)^{-1} \tag{23}$$

$$t^{f4(a)} = (1 \oplus t^a)^{-1/2} \tag{24}$$

$$f5(a) = -2a \text{ modulo } 2^b-1 \tag{25}$$

The description which follows is in tabulated form, where statements of the general steps or functions begin with capital letters (e.g. A) at the left of the column, detailed process steps or statements begin in the center and include a number associated with the first part, and the contents of important variables that were changed in the step begin with a lower case letter (e.g. $a$) to the right of the column. Details of the various cases now follow.

Case A and B Processing ($i \neq 15, j \neq 15$)

Function

Process

Contents of Changed Variables/Comments

A - Set Variables to Syndromes

1. $SR0 \leftarrow S0$, $SR1 \leftarrow S1$, $SR2 \leftarrow S2$ $a$. $SR0 = e1 \oplus e2 \oplus e3$ $SR1 = e1[t^i] \oplus e2[t^j] \oplus e3[t^k]$ $SR2 = e1[t^{2i}] \oplus e2[t^{2j}] \oplus e3[t^{2k}]$ B - Shift SR1 and SR2 15-$i$ times 2. R $\leftarrow$ $F1(i)$ 2.1 If $R = 0$ go to 3

$SR1 \leftarrow SR1[t]$ $SR2 \leftarrow SR2[t^2]$ $R \leftarrow R-1$

Go to 2.1

$b$. $SR1 = e1 \oplus e2[t^{j-i}] \oplus e3[t^{k-i}]$ $SR2 = e1 \oplus e2[t^{2(j-i)}] \oplus e3[t^{2(k-i)}]$ C - Add $SR1$ and $SR2$ and enter into $SR2$. Also add $SR0$ and $SR1$ and enter into $SR1$.

3. $SR2 \leftarrow SR1 \oplus SR2$ $SR1 \leftarrow SR0 \oplus SR1$ $C$. $SR2 = e2[t^{j-i}][I\ t^{j-i}]\quad e3[t^{k-i}][I\ t^{k-i}]$ $SR1 = e2[I\ t^{j-i}]\quad e3[I\ t^{k-i}]$ D - Shift $SR2$ $m$.times where $m = -(j-i)/2$ modulo 15

4. $R \leftarrow F2(j-i)$ 4.1 If $R = 0$ go to 5

$SR2 \leftarrow SR2[t^2]$ $R \leftarrow R-1$

Go to 4.1

$d$. $SR2 = e2[I \oplus t^{j-i}] \oplus e3[t^{k-j}][I \oplus t^{k-i}]$

E - Add $SR1$ and $SR2$ and enter into $SR2$

5. $SR2 \leftarrow SR1 \oplus SR2$ $e$. $SR2 = e3[I \oplus t^{k-j}][I \oplus t^{k-i}]$ F - Shift $SR2$ $f4(k-j)$ times 6. $R \leftarrow f4(k-j)$ 6.1 If $R = 0$ go to 7

$SR2 \leftarrow SR2[t^2]$ $R \leftarrow R-1$

Go to 6.1

$f$. $SR2 = e3[I\ t^{k-i}]$

G - Add $SR1$ and $SR2$ and enter into $SR1$

7. $SR1 \leftarrow SR1 \oplus SR2$ $g$. $SR1 = e2[I\ t^{j-i}]$

Parameter Table for $b$=4

| $a$ | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| $f_1(a)$ | 0 | 14 | 13 | 12 | 11 | 10 | 9 | 8 | 7 | 6 | 5 | 4 | 3 | 2 | 1 |
| $f_2(a)$ | 0 | 7 | 14 | 6 | 13 | 5 | 12 | 4 | 11 | 3 | 10 | 2 | 9 | 1 | 8 |
| $f_3(a)$ | 0 | 3 | 6 | 11 | 12 | 5 | 7 | 2 | 9 | 13 | 10 | 1 | 14 | 8 | 4 |
| $f_4(a)$ | 0 | 9 | 3 | 13 | 6 | 10 | 11 | 1 | 12 | 14 | 5 | 8 | 7 | 4 | 2 |
| $f_5(a)$ | 0 | 13 | 11 | 9 | 7 | 5 | 3 | 1 | 14 | 12 | 10 | 8 | 6 | 4 | 2 |

The specific use of the table is to receive an argument $a$ used with a particular function, to obtain a table value for use in a succeeding step. For example, the statement ($f2(6)$ causes the table to be accessed to obtain the value 12.

H - Shift $SR2$ $f4(k-i)$ times

8. $R \leftarrow f4(k-i)$ 8.1 If $R = 0$ go to 9

$SR2 = SR2[t^2]$ $R \leftarrow R-1$

Go to 8.1

*h*. $SR2 = e3$ = error pattern for *k* track

I - Add $SR0$ and $SR2$ and enter in $SR0$

9. $SR0 \leftarrow SR0 \oplus SR2$

*i*. $SR0 = e1 \oplus e2$

J - Shift SR1 $f3(j-i)$ times

10. $R = f3(j-i)$ 10.1 If $R = 0$ go to 11

$SR1 \leftarrow SR1\ [t]$ $R \leftarrow R-1$

Go to 10.1

*j*. $SR1 = e2$ = error pattern for *j* track

K - Add $SR0$ and $SR1$ and enter in $SR0$

11. $SR0 \leftarrow SR0 \oplus SR1$

*k*. $SR0 = e1$ = error pattern for *i* track

L - Check for two and one errors

12. If $k=15$ and $SR2 \neq 0$ go to 14

If $j=15$ and $SR1 \neq 0$ go to 14

*l*. Both are uncorrectable error conditions

M - Correct the errors

13. $Zi'' \leftarrow Zi' \oplus SR0$ $Zj'' \leftarrow Zj' \oplus SR$ $Zk'' \leftarrow Zk' \oplus SR2$

EXIT

N - Uncorrectable exit error indication

14. $E \leftarrow 1$

Case C ($i \neq 15, j=15$)

A - Set variables to syndromes

1. $SR0 \leftarrow S0$, $SR1 \leftarrow S1$, $SR2 \leftarrow S2$

*a*. $SR0 = e1 \oplus e2$ $SR1 = e1[t^i] \oplus e2[t^j]$

B - Shift $SR1$ and $SR2$ $15-i$ times

2. $R \leftarrow f1(i)$ 2.1 If $R = 0$, go to 3

$SR1 \leftarrow SR1[t]$, $SR2 = SR2[t^2]$ $R \leftarrow R-1$

Go to 2.1 .

*b*. $SR1 = e1 \oplus e2[t^{j-i}]$ $SR2 = e1 \oplus e2[t^{2(j-i)}]$

C - Add $SR2$ and $SR1$ and enter in $SR2$. Add $SR0$ and $SR1$ and enter in $SR1$.

3. $SR2 \leftarrow SR1 \oplus SR2$ $SR1 \leftarrow SR0 \oplus SR1$

*c*. $SR1 = e2[I\ t^{j-i}]$ $SR2 = e2[t^{j-i}][I\ t^{j-i}]$

D - Shift $SR2$ and compare with $SR1$ until equal, the shifting being $R$ times where $0 \leq R \leq 14$.

4. $R \leftarrow 0$ 4.1 If $R = 15$ go to step 14 of case A

If $SR1 = SR2$ go to 5

$SR2 = SR2[t^2]$ $R \leftarrow R+1$

Go to 4.1

*d*. $SR2 = e2[I\ t^{j-i}]$ $R = -(j-i)/2$ modulo 15. If $R=15$, three or more tracks have failed and can't be corrected without independent pointers.

E - Obtain pointer value $j$ as $f5(R)+i$ modulo 15. Add $SR1$ and $SR2$ and enter into $SR1$.

5. $R1 = f5(R)$ $j = (R1+i) \bmod 15$ $SR2 \leftarrow SR1 \oplus SR2$

Go to step 10 of case A

*e*. $SR2 = 0$ $j$ = track number of second erroneous track

Case D ($i=15$)

A - Set variables to syndromes

1. $SR0 \leftarrow S0$, $SR1 \leftarrow S1$, $SR2 \leftarrow S2$

*a*. $SR0 = e1$ $SR1 = e1[t^i]$ $SR2 = e1[t^{2i}]$

B - Shift $SR1$ and $SR2$ and compare with $SR0$ until $SR0$ and $SR1$ are the same, the shift being $R$ times where $R < 15$.

2. $R \leftarrow 0$ 2.1 If $R = 15$, go to 14 of case A

If $SR0 = SR1$ go to 3

$SR1 = SR1[t]$ $SR2 = SR2[t^2]$ $R \leftarrow R+1$

Go to 2.1

*b*. $SR1 = e1$, $SR2 = e1$ $R = -i$ modulo 15

If $R = 15$, two or more tracks have failed and can't be corrected without independent pointers.

C - Obtain pointer value $i$ as $f1(R)$. Add $SR1$ and $SR2$ and enter into $SR2$. Add $SR0$ and $SR1$ and enter into $SR1$.

3. $i = f1(R)$ $SR2 = SR1 \oplus SR2$ $SR1 = SR0 \oplus SR1$

Go to step 12 of case A

*c*. $SR0 = e1$ $SR1 = 0$ $SR2 = 0$

While the invention has been particularly shown and described with reference to a preferred embodiment thereof, it will be understood by those skilled in the art that various changes in form and detail may be made therein without departing from the spirit and scope of the invention.

What is claimed is:

1. The method of processing data which method is performed automatically in a data processing system, and comprises the steps of:

a. providing information bytes $Z3-Z(K-1)$;

b. serially processing said bytes, beginning with byte $Z(K-1)$, into the next step;

c. generating check bytes $Z0$, $Z1$ and $Z2$ by the substeps comprising 1. initially matrix multiplying the first byte received from step (*b*) in accordance with matrices of $T^{3\lambda}$, $T^{\lambda}$ $(I \oplus T^{\lambda} \oplus T^{2\lambda})$, and $(I \oplus T^{\lambda} \oplus T^{2\lambda})$ to form, the first of a series of respective products $P1$, $P2$ and $P3$;

2. subsequently modulo two adding each byte with each product $P3$ that existed prior to such addition, to form a series of sums $S$;

3. matrix multiplying each sum $S$ by the matrices of step $C1$ to form three results said first result forming a new $P1$;

4. modulo two adding said second result with the old $P1$ to form a new $P2$;

5. modulo two adding said third result with the old $P2$ to form a new $P3$;

whereby, when byte $Z3$ has been processed in accordance with steps (2–5), products $P1$, $P2$ and $P3$ respectively form check bytes $Z0$, $Z1$ and $Z2$;

d. and combining said check bytes with said information bytes to form a codeword, said matrices and bytes being related whereby each byte contains $f$ bits, where $f=bm$, $f$, $b$ and $m$ being integers, $K$ is an integer $3 < K < 2^b$, $T$ is a companion matrix of degree $f$, $\lambda=r(2^F-1)/(2^b-1)$, $r$ is a positive integer prime to $2^b-l$, and $I$ is an indentity matrix.

2. The method of claim 1 comprising the steps of:

transposing said codeword to form a new codeword containing bytes $Z0'-Z(K-1)'$;

generating syndromes $S0$, $S1$ and $S2$ according to the relationships $$S0 = Z0' \oplus Z1' \text{-----} \oplus Z(K-1)'$$

$$S1 = Z0' \oplus Z1' [T^{\lambda}] \oplus Z2'][T^{\lambda\ 2}] \text{--} \oplus Z(K-1)' [T^{\lambda\ K-1}]$$

$$S3 = Z0' \oplus Z1' [T^{2\lambda}] \oplus Z2' [T^{2\lambda\ 2}] \text{---} \oplus Z(K-1)' [T^{2\lambda\ K-1}];$$

generating an error pattern using said syndromes;

and combining said error pattern with the associated byte in error to produce a byte of correct data.

3. The method of claim 2 wherein said error pattern generation step produces an error pattern $e1$ in accordance with the relationships:

$$S0 = e1$$

$$S1 = e1\ [T^{\lambda\ i}]$$

$$S2 = e1\ [T^{\lambda\ 2i}]$$

and said step further comprises the sub-step of generating the pointer $i$ from said relationships, to point to the byte containing an error.

4. The method of claim 2 comprising:

generating, during said transposing step, a pointer $i$ pointing to a byte that might contain an error;

generating said error pattern el by solving the following relationships for el, e2 and j:

$$S0 = e1 \oplus e2$$

$$S1 = e1\ [T^{\lambda\ i}] \oplus e2\ [T^{\lambda\ j}]$$

$$S2 = e1\ [T^{2\lambda\ i}] \oplus e2\ [T^{2\lambda\ j}]$$

where $j$ represents a pointer to another byte that might be erroneous, and $e2$ is the error pattern for correcting such other byte.

5. The method of claim 2 comprising:

generating, during said transposing step, three pointers $i, j$ and $k$ where $0 \leq i < j < k < 2^{b}-1$, pointing to bytes that might contain errors;

generating eeror patterns $e1$, $e2$ and $e3$ as part of said error pattern generating step by simultaneous solution of the equations:

$$S0 = e1 \oplus e2 \oplus e3$$

$$S1 = e1\ [T^{\lambda\ i}] \oplus e2\ [T^{\lambda\ j}] \oplus e3\ [T^{\lambda\ k}]$$

$$S2 = e1\ [T^{2\lambda\ i}] \oplus e2\ [T^{2\lambda\ j}] \oplus e3\ [T^{2\lambda\ k}]$$

and adding modulo-two $e1$, $e2$ and $e3$ to bytes $Zi'$, $Zj'$ and $Zk'$ respectively.

6. The method of claim 5 wherein:

said transposing step includes writing said codeword in parallel tracks on a magnetic tape and reading it therefrom, whereby said triple track error correction is done.

7. The method of claim 2 including;

determining whether an uncorrectable error exists and providing an indication thereof if it does exist.

8. The method of claim 2 wherein:

said transposing step comprises the substeps of first writing said codeword in parallel tracks on a magnetic record media and thereafter reading such codeword from said media to form said new codeword.

* * * * *